United States Patent
Hussain et al.

(10) Patent No.: US 11,030,210 B2
(45) Date of Patent: Jun. 8, 2021

(54) HIERARCHICAL RULES FOR DISPLAYING USER INTERFACE PAGES

(71) Applicant: salesforce.com, inc., San Francisco, CA (US)

(72) Inventors: Zenil N. Hussain, Pleasanton, CA (US); Ruifeng Xu, San Mateo, CA (US); Wenqing Dai, Richmond, CA (US); Kavitha Musthyala, Dublin, CA (US); Dean Moses, Berkeley, CA (US); Adheip Varadarajan, Daly City, CA (US); Sakshi Arora, San Fracisco, CA (US)

(73) Assignee: salesforce.com, inc., San Francisco, CA (US)

( * ) Notice: Subject to any disclaimer, the term of this patent is extended or adjusted under 35 U.S.C. 154(b) by 169 days.

(21) Appl. No.: 15/861,354

(22) Filed: Jan. 3, 2018

(65) Prior Publication Data
US 2019/0205403 A1 Jul. 4, 2019

(51) Int. Cl.
*G06F 16/25* (2019.01)
*G06F 16/21* (2019.01)
(Continued)

(52) U.S. Cl.
CPC ............ *G06F 16/252* (2019.01); *G06F 16/21* (2019.01); *G06F 16/23* (2019.01); *G06F 16/248* (2019.01);
(Continued)

(58) Field of Classification Search
CPC ........ G06F 16/252; G06F 16/21; G06F 16/23; G06F 16/282; G06F 16/24564; G06F 16/248; G06F 21/604
(Continued)

(56) References Cited

U.S. PATENT DOCUMENTS 5,092,083 A 3/1992 Raffaelli
5,169,534 A 12/1992 Maddalone
(Continued)

OTHER PUBLICATIONS

Rathfux, Thomas, et al., "Adding Custom Widgets to Model-driven GUI Generation", EICS '16, Brussels, Belgium, Jun. 21-24, 2016, pp. 16-26.*
(Continued)

*Primary Examiner* — Robert Stevens
(74) *Attorney, Agent, or Firm* — Dergosits & Noah LLP; Todd A. Noah (57) ABSTRACT

A system receives an action override rule and stores it, including display criteria associated with a user interface page, into a hierarchy of rules for displaying multiple user interface pages. The system determines whether the action override rule in the hierarchy of rules matches request criteria associated with a user action, in response to receiving the user action. The system displays the user interface page associated with the display criteria if the action override rule in the hierarchy of rules matches the request criteria associated with the user action. If the action override rule in the hierarchy of rules does not match the request criteria associated with the user action, then the system can identify a hierarchical rule that is a hierarchical match for the request criteria associated with the user action; and display a user interface page associated with the hierarchical rule that is the hierarchical match.

18 Claims, 5 Drawing Sheets

(51) Int. Cl.
  *G06F 16/23* (2019.01)
  *G06F 16/28* (2019.01)
  *G06F 16/2455* (2019.01)
  *G06F 16/248* (2019.01)
  *G06F 21/60* (2013.01)

(52) U.S. Cl.
  CPC ...... *G06F 16/24564* (2019.01); *G06F 16/282* (2019.01); *G06F 21/604* (2013.01)

(58) Field of Classification Search
  USPC .......................................................... 707/705
  See application file for complete search history.

(56) References Cited

U.S. PATENT DOCUMENTS

| | | | |
|---|---|---|---|
| 5,178,425 A | 1/1993 | Kumagai et al. | |
| 5,551,030 A * | 8/1996 | Linden ................ | G06F 3/0481 |
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,161,149 A | 12/2000 | Achacoso et al. | |
| 6,169,534 B1 | 1/2001 | Raffel et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,754,702 B1 * | 6/2004 | Kennelly ............. | H04L 41/024 709/223 |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,686 B1 * | 2/2007 | Bahrs ................. | G06F 8/38 715/210 |
| 7,340,411 B2 | 3/2008 | Cook | |
| 7,356,482 B2 | 4/2008 | Frankland et al. | |
| 7,401,094 B1 | 7/2008 | Kesler | |
| 7,606,835 B2 * | 10/2009 | Laaser ................ | G06Q 10/10 |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,661,076 B2 * | 2/2014 | Herman ............... | H04L 67/26 709/203 |
| 9,329,808 B2 * | 5/2016 | Dumitrescu .......... | G06F 3/1275 |
| 9,805,337 B2 * | 10/2017 | Kraenzel ............. | G06Q 10/10 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0033616 A1 * | 2/2005 | Vavul ................. | G06Q 10/02 705/5 |
| 2005/0050555 A1 | 3/2005 | Exley et al. | |
| 2005/0091098 A1 | 4/2005 | Brodersen et al. | |

(56) References Cited

U.S. PATENT DOCUMENTS

| | | | |
|---|---|---|---|
| 2005/0193055 A1* | 9/2005 | Angel | G06Q 30/02 709/202 |
| 2008/0263462 A1* | 10/2008 | Mayer-Ullmann | G06F 9/451 715/762 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2012/0233137 A1 | 9/2012 | Jakobson et al. | |
| 2013/0055147 A1* | 2/2013 | Vasudev | G06F 8/38 715/781 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0311559 A1* | 11/2013 | Swinson | H04L 67/306 709/204 |
| 2014/0006441 A1* | 1/2014 | Torman | G06F 21/6218 707/769 |
| 2014/0032664 A1* | 1/2014 | Wookey | H04L 51/32 709/204 |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0106736 A1* | 4/2015 | Torman | G06F 16/13 715/745 |
| 2015/0172563 A1 | 6/2015 | Jakobson et al. | |

OTHER PUBLICATIONS

U.S. Appl. No. 13/986,251, filed Apr. 16, 2013, Specification, 12 pages.

* cited by examiner

Mobile Entity: Accounts
Select the attributes from the Available Attributes list that you would like displayed on the form. Set the order in which they are displayed by moving them up and down in the selected list.

| Available Attributes | Selected Attributes |
|---|---|
| Account Number | Account Name * |
| Account Rating | Primary Contact |
| Address 1 | Main Phone |
| Address 1: Address Type | Email |
| Address 1: County | Website |
| Address 1: Fax | Address 1: Street 1 |
| Address 1: Freight Terms | Address 1: Street 2 |
| Address 1: Latitude | Address 1: City |
| Address 1: Longitude | Address 1: State/Province |
| Address 1: Name | Address 1: ZIP/Postal Code |
| Address 1: Post Office Box | Address 1: Country/Region |
| Address 1: Primary Contact Name | Industry |
| Address 1: Shipping Method | Owner * |
| Address 1: Street 3 | Status * |
| Address 1: Telephone 2 | |

Buttons: Add >, Add All >>, < Remove, << Remove All, Move Up, Move Down, Read Only

| Default Account Records Rule 304 | Default Contact Records Rule 306 | Default Lead Records Rule 308 | Default Opportunity Records Rule 310 | Default Custom Company Records Rule 312 | Action Override Rule to View Company Records on Smartphone Page 314 | Action Override Rule to View Managers Company Records on Smartphone Page 316 |

Default CRM Database Application Rule 302

HIERARCHICAL RULES FOR DISPLAYING USER INTERFACE PAGES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store information in digital objects, such as storing data in the electronic records for the business accounts, the accounts' contacts, the business leads, and the business opportunities that are entities in a customer relationship management (CRM) database. A digital object can be a database system's electronic form that stores information, such as a contact's given name, family name, job title, employer name, street address, city, state, zip code, e-mail address, and telephone number. The digital objects that are supplied by the provider of a database system may be referred to as standard objects. In contrast, a custom object can be a database system's electronic form that an administrator of the database system's end user creates by selecting options offered by a provider of the database system to create an electronic form that stores information that meets the end user's needs. For example, the vendor of the CRM database application used by Acme Corporation offers selectable options that enable Acme's system administrator to create a custom company entity to store data for companies with which Acme does not yet have an account.

A database system can respond to a user action by displaying a user interface page. For example, when an Acme sales representative requests MegaCorp account data, a CRM database application displays a standard account records page that includes MegaCorp account data. An enterprise that uses a database system can pay a computer programmer to write code that both creates a custom user interface page and configures the database system to supersede the database system's standard response to a specified user action by displaying the custom user interface page. For example, Acme pays a computer programmer to write code that both creates a custom account records page and configures the CRM database application to display the custom account records page. When Acme's account manager for the MegaCorp account requests MegaCorp account data, the reconfigured CRM database application displays the custom account records page that includes MegaCorp account data that is accessible to Acme's sales representatives, and also includes confidential account data that the account manager created for the MegaCorp account.

BRIEF SUMMARY

An enterprise that uses a database system may have to pay a computer programmer a significant amount to write code that both creates a custom user interface page and configures the database system to supersede the database system's standard response to a specific user action by displaying the custom user interface page. Furthermore, the enterprise may have to wait a significant amount of time after the need for such code is identified before the computer programmer writes and tests the code, and then reconfigures the database system. Additionally, such code may include errors that are difficult and time-consuming to correct.

In accordance with embodiments, there are provided systems and methods for hierarchical rules for displaying user interface pages. A system stores an action override rule, which includes display criteria associated with a user interface page, into a hierarchy of rules for displaying multiple user interface pages, in response to receiving the action override rule. The system determines whether the action override rule in the hierarchy of rules matches request criteria associated with a user action, in response to receiving the user action. The system displays the user interface page associated with the display criteria in response a determination that the action override rule in the hierarchy of rules matches the request criteria associated with the user action. If the action override rule in the hierarchy of rules does not match the request criteria associated with the user action, then the system can identify a hierarchical rule that is a hierarchical match for the request criteria associated with the user action; and display a user interface page associated with the hierarchical rule that is the hierarchical match for the request criteria associated with the user action.

For example, an Acme Corporation system administrator creates an action override rule by selecting a CRM database application, a view record option, a custom company entity option, a small form factor option, and a manager role option as criteria for displaying a page created by the administrator for viewing a manager's company records on a smartphone. and a system stores the administrator's action override rule into a hierarchy of rules for displaying CRM database application pages. An Acme sales manager requests Mega-Corp company data via her smartphone, and the system determines whether any action override rule in the hierarchy of rules matches the sales manager's request criteria. The system displays the page for viewing a manager's company records on a smartphone, which includes all of her sales representatives' MegaCorp company data, to the sales manager's smartphone because the administrator's action override rule matches the sales manager's request criteria. If the administrator's action override rule does not match the request criteria for an Acme sales representative's request for MegaCorp's company data via his smartphone, then the system can identify another one of the administrator's action override rule as the best match for the sales representative's request criteria. Then the system can display the other action override rule's page for viewing company records on a smartphone, which includes some MegaCorp data, to the sales representative's smartphone.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for hierarchical rules for displaying user interface pages. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for hierarchical rules for displaying user interface pages will be described with reference to example embodiments. The following detailed description will first describe an example method, frame, and representation for hierarchical rules for displaying user interface pages. Then a system for hierarchical rules for displaying user interface pages is described.

While one or more implementations and techniques are described with reference to an embodiment in which hierarchical rules for displaying user interface pages are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Figure 1:
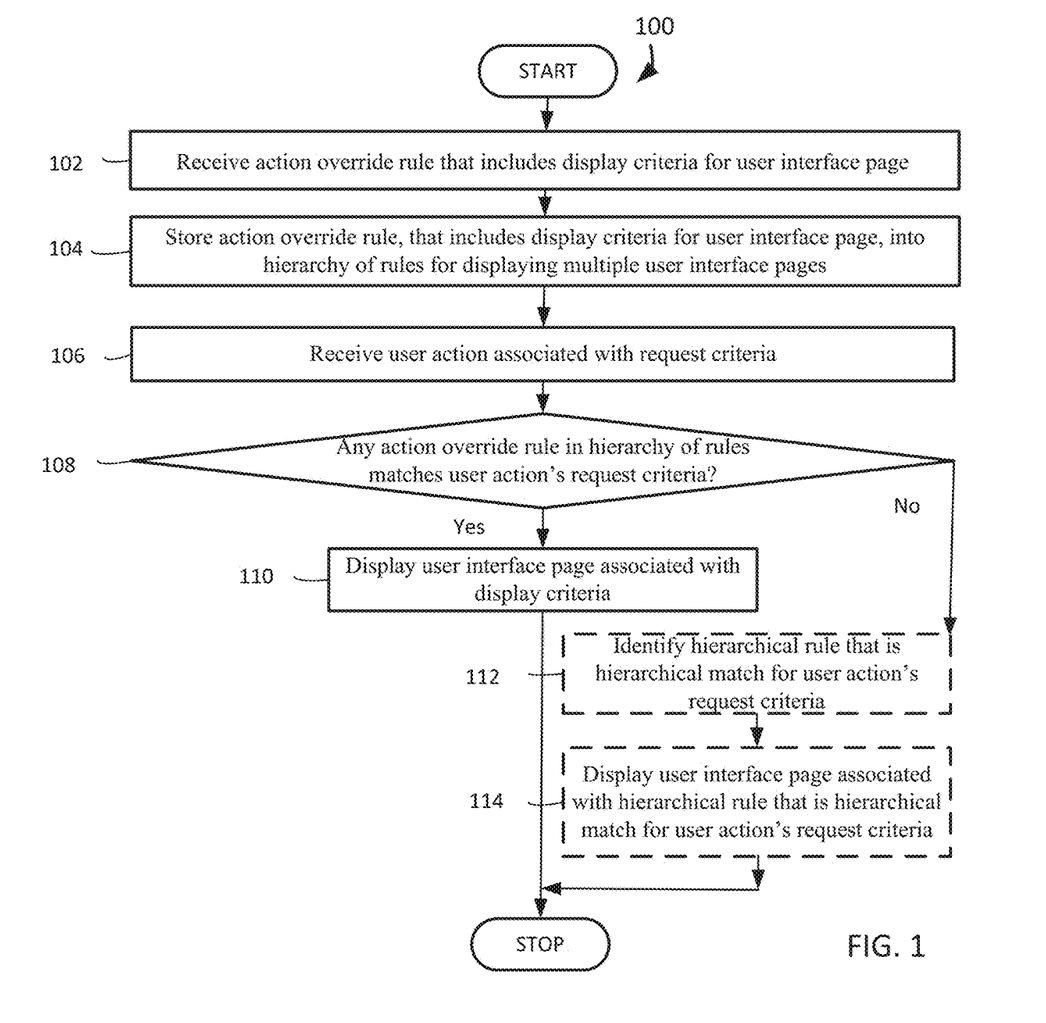
FIG. 1 is an operational flow diagram illustrating a high-level overview of a method for hierarchical rules for displaying user interface pages, in an embodiment.

FIG. 1 is an operational flow diagram illustrating a high-level overview of a method 100 for hierarchical rules for displaying user interface pages. As shown in FIG. 1, the method 100 uses hierarchical rules to determine which user interface page to display.

An action override rule, which includes display criteria associated with a user interface page, is received, block 102. The system generates action override rules that are used to determine which user interface pages to display. For example, and without limitation, this can include a system receiving an action override rule created by an Acme Corporation system administrator selecting a CRM database application option, a view records option, a custom company entity option, a smartphone option, and a sales manager option as criteria for displaying a page created by the administrator for viewing a manager's company records on a smartphone. Although this example describes the system receiving an action override created by a system administrator selecting a custom company entity option that is based on a custom object, the action override rule may be created by a system administrator selecting an option that is based on a standard object, such as a standard account entity option. The system can be an application that is interacting with a group of hardware and/or software related to a database.

An action override rule can be one of a set of explicit regulations governing conduct within a particular sphere, which supersedes the process of doing something to achieve an aim. Display criteria can be standards for deciding which information to show on a screen, and may be referred to as a "pivot." A user interface page can be a section of information displayed on a screen by which a person operating a computer interacts with the computer. A system administrator can be a person who manages the operation of one or more computers. A display criterion option can be a standard that may be chosen for deciding which information to show on a screen. A software application can be a computer program designed to perform a group of coordinated functions, tasks, and/or activities for the benefit of a user. A user action can be the process of a person operating a computer to achieve an aim. An entity can be a data structure that stores a specific type of data. A form factor can be the physical size and shape of a piece of computer hardware. An organizational role can be the function assumed by a person in a particular situation, which is based on the person's hierarchical position in a group of people. A record type can be a category of related items of information that are handled as a unit.

The following examples describe how an administrator may create a user interface page and an action override rule for displaying the created user interface page. The system displays a list of options for creating a custom page, which include a software application option, a user action option, an entity option, a form factor option, an organizational role option, and a record type option, and the administrator selects the software application option. The system responds to the selection of the software application option by displaying a list of options for creating a custom page, which include a CRM database application option, a spreadsheet application option, and an accounting application option, and the administrator selects the CRM database application option. The system responds to the selection of the CRM database application option by displaying a list of options for creating a custom page, which include the user action option, the entity option, the form factor option, the organizational role option, and the record type option, and the administrator selects the user action option.

The system responds to the selection of the user action option by displaying a list of options for creating a customized page, which include a view record option, an edit record option, a create record option, a delete record option, a list object overview option, a view navigation tab option, a convert record option, and a decline event option, and the administrator selects the view record option. The system responds to the selection of the view record option by displaying a list of options for creating a custom page, which include the entity option, the form factor option, the organizational role option, and the record type option, and the administrator selects the entity option. The system responds to the selection of the entity option by displaying a list of options for creating a customized page, which include an account entity option, a contact entity option, a lead entity option, an opportunity entity option, and a custom company entity option, and the administrator selects the custom company entity option. The system responds to the selection of the custom company entity option by displaying a list of options for creating a customized page, which include custom company attributes options.

Figure 2:
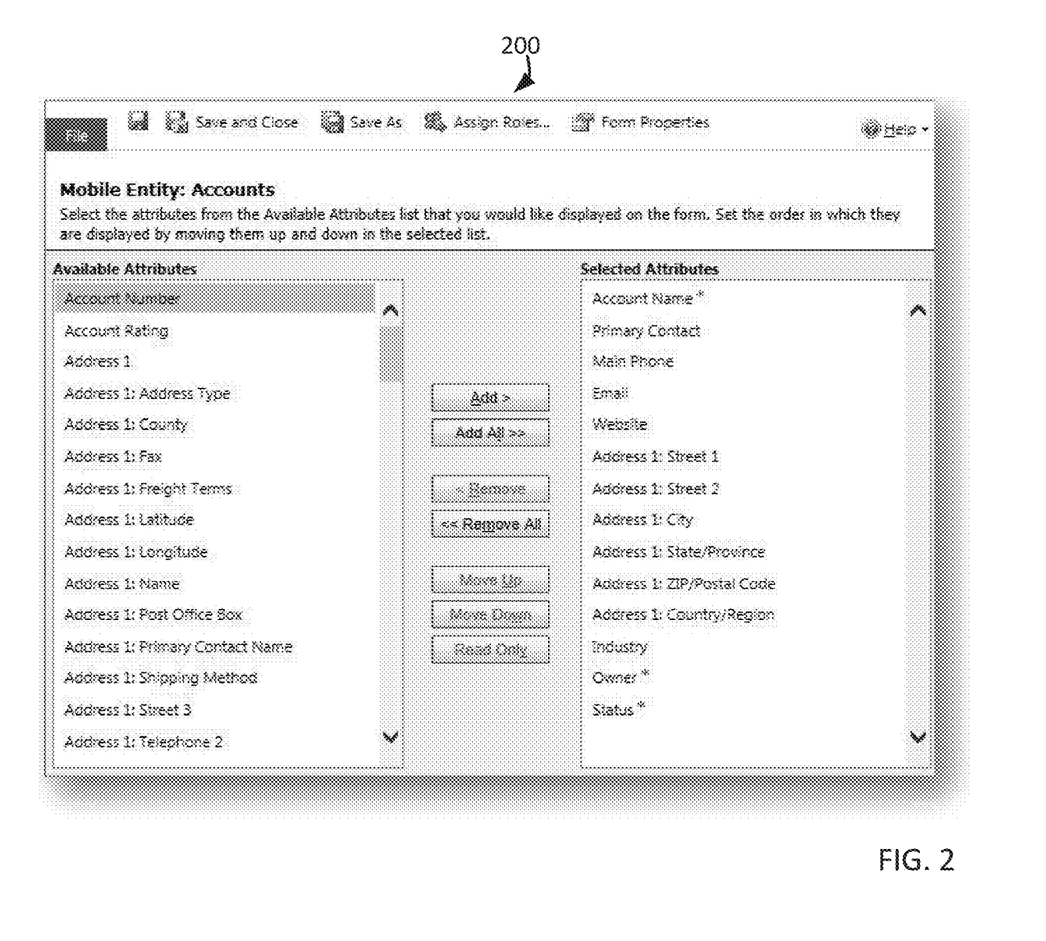
FIG. 2 depicts an example frame for hierarchical rules for displaying user interface pages, in an embodiment.

FIG. 2 depicts an example frame 200 for hierarchical rules for displaying user interface pages, in an embodiment. Although FIG. 2 depicts account attributes options instead of custom company attributes options, and this paragraph describes the process of displaying and selecting account attributes options, the process of displaying and selecting custom company attributes options would be essentially the same process. The administrator creates a page for viewing account records on a smartphone page by selecting which account attributes in the frame 200's list of account attributes will be displayed by a smartphone. For example, the administrator selects options to display the account name attribute and the primary contact attribute because the administrator decides that these are essential attributes for a smartphone to display.

Even though the relatively large size of a desktop computer screen can easily display the standard account records page that includes the account number attribute and the account rating attribute, the administrator does not select the options for the custom page to display the account number attribute or the account rating attribute because the administrator decides that these are not essential attributes for the relatively small size of a smartphone to display. In addition to selecting an option for a custom page to display one account attribute, the administrator can also select an option for the custom page to display all account attributes, select an option for the custom page to no longer display one account attribute, and select an option for the custom page to no longer display all account attributes. Furthermore, the administrator can select options to move the display of a selected account attribute up or down on the custom page relative to the display of any other selected account attributes.

The frame 200 may be part of a larger display screen that includes fields for users to enter commands to create, retrieve, edit, and store information. Because the frame 200 is a sample, the frame 200 could vary greatly in appearance. For example, the relative sizes and positioning of the graphical images are not important to the practice of the present disclosure. The frame 200 can be depicted by any visual display, but is preferably depicted by a computer screen. The frame 200 could also be output as a report and printed or saved in electronic formats, such as PDF. The frame 200 can be part of a personal computer system and/or a network, and operated from system data received by the network, and/or on the Internet. The frame 200 may be navigable by a user. Typically, a user can employ a touch screen input, voice command, or a mouse input device to point-and-click to locations on the frame 200 to manage the graphical images on the frame 200. Alternately, a user can employ directional indicators, or other input devices such as a keyboard. The graphical images depicted by the frame 200 are examples, as the frame 200 may include much greater amounts of graphical images. The frame 200 may also include fields in which a user can input information.

After the administrator is finished selecting custom company attributes, the administrator selects an option to save the newly created page for viewing company records on a smartphone. Then the administrator decides to create another custom page for viewing company records on a smartphone. Therefore, the administrator either creates a copy of the newly created page for viewing company records on a smartphone, or repeats the process to create another page for viewing company records on a smartphone. The administrator decides to create the other custom page based on an organizational role, the administrator selects the organizational role option from the list of options that include the organizational role option and the record type option. The system responds to the selection of the organizational role option by displaying a list of options for creating a custom page, which include a sales manager option and a sales representative option, and the administrator selects the sales manager option. After the administrator selects the sales manager option, the administrator selects the option to save the newly created page for viewing a manager's company records on a smart phone.

Similar to the creation of a user interface page, the administrator creates an action override rule for displaying a user interface page. The system displays a list of options for creating an action override rule for displaying a custom page, which include a software application option, a user action option, an entity option, a form factor option, an organizational role option, and a record type option, and the administrator selects the software application option.

The system responds to the selection of the software application option by displaying a list of options for creating an action override rule for displaying a custom page, which include a CRM database application option, a spreadsheet application option, and an accounting application option, and the administrator selects the CRM database application option. The system also responds to the selection of the CRM database application option by displaying a list of options for creating an action override rule for displaying a custom page, which include the user action option, the entity option, the form factor option, the organizational role option, and the record type option, and the administrator selects the user action option. In addition, the system responds to the selection of the user action option by displaying a list of options for creating an action override rule for displaying a custom page, which include a view record option, an edit record option, a create record option, a delete record option, a list object overview option, a view navigation tab option, a convert record option, and a decline event option, and the administrator selects the view record option. The system also responds to the selection of the view record option by displaying a list of options for creating an action override rule for displaying a custom page, which include the entity option, the form factor option, the organizational role option, and the record type option, and the administrator selects the entity option. In addition, the system responds to the selection of the entity option by displaying a list of options for creating an action override rule for displaying a custom page, which include that includes the account entity option, the contact entity option, the lead entity option, the opportunity entity, and the custom company entity option, and the administrator selects the custom company entity option. The system also responds to the selection of the custom company entity option by displaying a list of options for creating an action override rule for displaying a custom page, which includes the form factor option, the organizational role option, and the record type option, and the administrator selects the form factor option. Also, the system responds to the selection of the form factor option by displaying a list of form factor options, which include a small form factor option, a medium form factor option, and a large form factor option, and the administrator selects the small form factor option.

After the administrator selects the small form factor option, the administrator selects an option to save the newly created action override rule for displaying the page to view company records on a smartphone. This newly created rule is based on the administrator's selections of options, and is the equivalent to the rule specified by the prose "If a user who is authorized to access the CRM database application uses a smartphone to request company records, display the page for viewing company records on a smartphone." The administrator did not have to write a single line of computer program code to create the action override rule for displaying the page to view company records on a smartphone.

The administrator also decides to create an action override rule for displaying the page to view manager's company records on a smart phone, so the administrator either creates a copy of the newly created action override rule for displaying the page to view company records on a smartphone, or repeats the process to create the action override rule for displaying the page to view company records on a smartphone. Then the administrator selects the organizational role option from the list of options that include the organizational role option and the record type option. The system responds to the selection of the organizational role option by displaying a list of options for creating an action override rule for displaying a custom page, which include a sales manager option and a sales representative option, and the administrator selects the sales manager option.

After the administrator selects the sales manager option, the administrator selects an option to save the newly created action override rule for displaying the page to view a manager's company records on a smartphone. This newly created rule is based on the administrator's selections of options, and is the equivalent to the rule specified by the prose "If a sales manager who is authorized to access the CRM database application uses a smartphone to request company records, display the page to view a manager's company records on a smartphone." The administrator did not have to write a single line of computer program code to create the action override rule for displaying the page to view a manager's company records on a smartphone.

In response to receiving an action override rule which includes display criteria associated with a user interface page, the action override rule is stored into a hierarchy of rules for displaying multiple user interface pages, block 104. The system stores action override rules that are used to determine which user interface pages to display. By way of example and without limitation, this can include the system storing the administrator's action override rule for displaying the page to view a manager's company records on a smartphone into a hierarchy of rules for displaying CRM database application pages.

Figure 3:
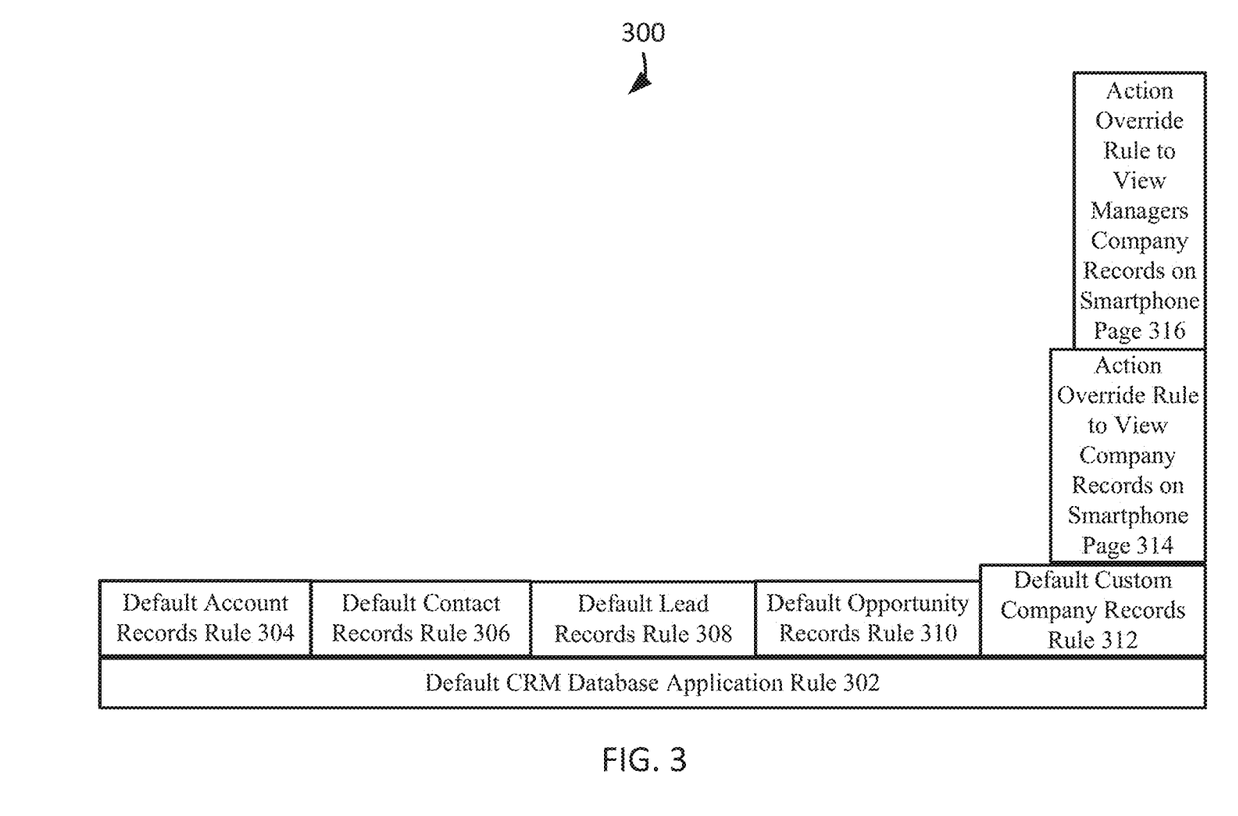
FIG. 3 depicts an example representation of hierarchical rules for displaying user interface pages, in an embodiment.

FIG. 3 depicts an example representation 300 of a hierarchy of rules for displaying user interface pages, in an embodiment. The representation 300 includes a default CRM database application rule 302, a default account records rule 304, a default contact records rule 306, a default lead records rule 308, a default opportunity records rule 310, a default custom company records rule 312, an action override rule to view company records on smartphone page 314, and an action override rule to view managers company records on smartphone page 316.

The hierarchy of rules may include a preconfigured rule that specifies preconfigured display criteria associated with a preconfigured user interface page. For example, when a sales representative requests access to the CRM database application, the system determines that the default CRM database application rule 302 identifies display criteria that match the sales representative's request criteria. Therefore, the system displays a standard CRM database application page, which is provided by the vendor of the CRM database application, that is identified by the default CRM database application rule 302, which is also provided by the vendor of the CRM database application. Then the sales representative selects a view company records option from the standard CRM database application page, which includes the view account records option, a view contact records option, a view lead records option, a view opportunity records option, which were provided by the vendor of the CRM database application, and a custom view company records option that was created by the system administrator. The system responds to the selection of the custom view company records option by determining that the default custom company records rule 312 identifies display criteria that match the sales representative's request criteria. Therefore, the system displays a custom company record page, which is created by the system administrator, that is identified by the default custom company records rule 312, which is also created by the system administrator. Although this example describes displaying a custom object's record page that is identified by a custom rule, the system can display a standard object's record page, which is provided by a vendor of a database system, that is identified by a standard rule, which is provided by the vendor of the database system. A hierarchy of rules can be a classification of explicit regulations governing conduct within a particular sphere, arranged according to relative importance or inclusiveness.

After storing an action override rule into a hierarchy of rules for displaying multiple user interface pages, a user action associated with request criteria is received, block 106. The system evaluates user actions to determine which user interface pages to display. In embodiments, this can include the system receiving a request from Acme's sales manager to view MegaCorp company data on her smartphone. Request criteria can be standards for deciding which information to obtain or retrieve for a system user.

In response to receiving a user action associated with request criteria, whether an action override rule in a hierarchy of rules matches the request criteria associated with the user action is determined, block 108. The system compares criteria between action override rules and user actions to determine which user interface pages to display. For example, and without limitation, this can include the system determining whether any action override rule in the hierarchy of rules matches the account manager's request criteria. A match can be the correspondence or similarity of elements that fulfills conditions of a computer search.

If an action override rule in a hierarchy of rules matches request criteria associated with a user action, a user interface page associated with display criteria specified by the matching action override rule is displayed, block 110. The system compares criteria between action override rules and user actions to determine which user interface pages to display. By way of example and without limitation, this can include the system displaying the page to view a manager's company records on a smartphone, which includes all of the sales representatives' MegaCorp company data, to the manager's smartphone because the administrator's action override rule to view managers company records on a smartphone 316 matches the sales manager's request criteria.

If an action override rule in a hierarchy of rules does not match request criteria associated with a user action, then a hierarchical rule that is a hierarchical match for the request criteria associated with the user action is optionally identified, block 112. The system identifies the hierarchical matches of criteria between action override rules and user actions to determine which user interface pages to display. In embodiments, this can include the system identifying the administrator's action override rule to view company records on a smartphone 314 as the best match for the request criteria for a sales representative's request to view MegaCorp's company data on his smartphone because the administrator's action override rule to view managers company records on a smartphone 316 is not the best match for this request criteria. A hierarchical match can be the correspondence or similarity of elements, some of which are arranged according to relative importance or inclusiveness, that fulfills conditions of a computer search.

The hierarchical match may be based on the greatest number of matching criterian. For example, the sales representative's request criteria include an organizational role criterion for a sales representative that does not match any of the hierarchal rules. The administrator's action override rule to view company records on a smartphone 314 identifies display criteria of the CRM database application option, the view record option, the custom company entity option, and the small form factor option, which match the sales representative's request criteria, and does not identify any organizational role option which could conflict with the sales representative's organizational role. In contrast, the administrator's action override rule to view managers company records on a smartphone 316 identifies display criteria for the CRM database application option, the view record option, the custom company entity option, and the small form factor option, which match the sales representative's request criteria, and also identifies the sales manager organizational role option, which conflicts with the sales representative's organizational role. Consequently, even though the hierarchy of rules does not include a rule that identifies display criteria that match all of the sales representative's request criteria, the system is still able to identify a hierarchical rule that is the best match for the sales representative's request criteria.

Additionally, a hierarchical match may be based on a selected option that is hierarchically above another option in a hierarchy of selectable options. For example, the system determines that the account manager organizational role, which is identified by the administrator's action override rule to view managers company records on a smartphone page 316, is hierarchically above the sales representative's organizational role because a sales manager is hierarchically above the sales representative supervised by the sales manager in the organizational roles options. Therefore, a hierarchical match may be based on the sales manager organizational role that enables a sales manager to view all of the sales representatives' data, while the sales representative organizational role does not enable a sales representative to view all of a sales manager's data.

In another example, a large form factor is hierarchically above a medium form factor in the form factor options, because a large form factor has the screen size to display all of the information that is configured for a medium form factor's screen size. Similarly, both the large form factor and the medium form factor are hierarchically above a small form factor in the form factor options, because both the large form factor and the medium form factor have the screen size to display all of the information that is configured for a small form factor's screen size. Consequently, when the system receives a request from Acme's sales manager to view MegaCorp company data on her tablet computer, which is a medium form factor, the system identifies the administrator's action override rule to view manager company records on a smartphone page 316 as the best match for the Acme sales manager's request criteria. The system identifies the rule 316 as the best match because this rule's display criteria are identical to the request criteria, with the exception of the form factor options, and the requesting tablet computer has the screen size to display all of the information that is configured for the smartphone's screen size. The system does not identify the default custom company records rule 312 as the best match because this rule's display criteria does not identify any form factor options, and the requesting tablet computer may not have the screen size to display all of the information that might be configured for a large form factor's screen size.

Furthermore, a hierarchical match may be based on a default criterion. For example, the system identifies the default custom company records rule 312 as the best match for the request criteria for a sales representative's request to edit company records on his desktop computer because the administrator has yet to create any action override rules for editing company records. Therefore, the system defaults to using the default custom company records rule 312 that the administrator created. Since the vendor of the CRM database application offered selectable options that enabled the administrator to create the default custom company records rule 312 based the standard default rules 304-310 that offer editing capability, the default custom company records rule 312 offers editing capability for custom company records.

The system's use of a hierarchical match enables the administrator to minimize the number of rules that need to be created. Therefore, an administrator does not have to create a rule for every combination of criteria. The administrator can provide default rules for the criteria combinations. and where needed provide per criteria customization rules.

After identifying the hierarchical match, a user interface page associated with a hierarchical rule that is the hierarchical match for request criteria associated with a user action is optionally displayed, block 114. The system identifies the hierarchical matches of criteria between action override rules and user actions to determine which user interface pages to display. For example, and without limitation, this can include the system displaying the page to view company records on a smartphone page, which includes some MegaCorp data, on the sales representative's smartphone.

The method 100 may be repeated as desired. Although this disclosure describes the blocks 102-114 executing in a particular order, the blocks 102-114 may be executed in a different order. In other implementations, each of the blocks 102-114 may also be executed in combination with other blocks and/or some blocks may be divided into a different set of blocks.

System Overview

Figure 4:
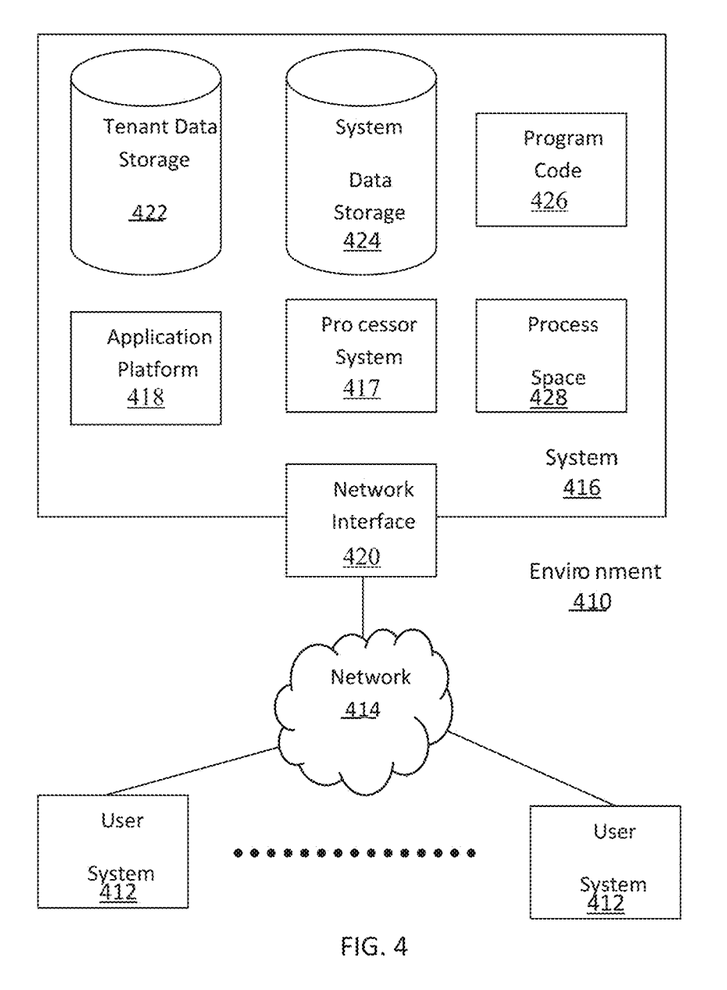
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
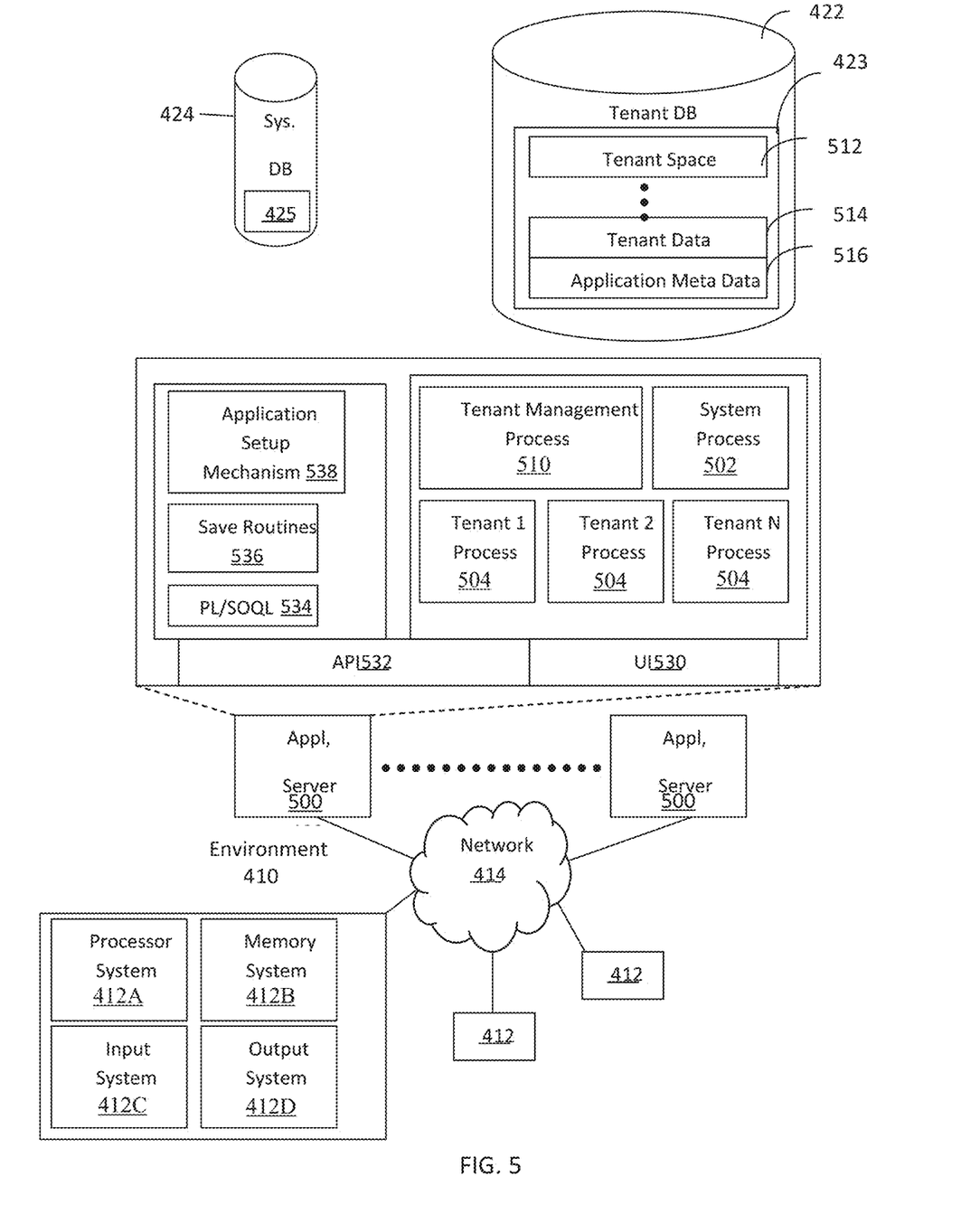
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc.

Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
store one or more action override rules into a hierarchy of rules applicable to a plurality of users, the hierarchy of rules having a default first level rule and one or more default second level rules, the default first level rule and the one or more default second level rules each including display criteria associated with a corresponding one of a plurality of user interface pages, each of the one or more action override rules including display criteria associated with a corresponding user interface page of the plurality of user interface pages;
receive a user action associated with a request criteria;
determine whether the request criteria associated with the user action matches the display criteria of the one or more action override rules;
cause, in response a determination that the display criteria of one of the action override rules matches the request criteria associated with the user action, the display of the user interface page associated with the display criteria of the action override rule with the matching criteria; and
cause, in response to a determination that there is no action override rule having display criteria that matches the request criteria associated with the user action, the display of the user interface page associated with the display criteria of a corresponding one of the one or more default second level rules.

2. The system of claim 1, wherein the display criteria are created by a system administrator selecting from a plurality of display criterion options.

3. The system of claim 1, wherein the display criteria are associated with at a plurality of a software application, an entity, a user action, a form factor, an organizational role, and the record type.

4. The system of claim 1, wherein the display criteria are associated with a custom object created by a system administrator.

5. The system of claim 1, wherein the hierarchy of rules comprises a preconfigured rule comprising preconfigured display criteria associated with the preconfigured user interface page.

6. The system of claim 1, comprising further instructions, which when executed, cause the one or more processors to:
identify a hierarchical rule that is a hierarchical match for the request criteria associated with the user action in response a determination that the action override rule in the hierarchy of rules does not match the request criteria associated with the user action; and
display a user interface page associated with the hierarchical rule that is the hierarchical match for the request criteria associated with the user action.

7. A non-transitory computer-readable medium comprising computer-readable program code to be executed by one or more processors, the program code including instructions to:
store one or more action override rules into a hierarchy of rules applicable to a plurality of users, the hierarchy of rules having a default first level rule and one or more default second level rules, the default first level rule and the one or more default second level rules each including display criteria associated with a corresponding one of a plurality of user interface pages, each of the one or more action override rules including display criteria associated with a corresponding user interface page of the plurality of user interface pages;
receive a user action associated with a request criteria;
determine whether the request criteria associated with the user action matches the display criteria of the one or more action override rules;
cause, in response a determination that the display criteria of one of the action override rules matches the request criteria associated with the user action, the display of the user interface page associated with the display criteria of the action override rule with the matching criteria; and
cause, in response to a determination that there is no action override rule having display criteria that matches the request criteria associated with the user action, the display of the user interface page associated with the display criteria of a corresponding one of the one or more default second level rules.

8. The computer program product of claim 7, wherein the display criteria are created by a system administrator selecting from a plurality of display criterion options.

9. The computer program product of claim 7, wherein the display criteria are associated with at a plurality of a software application, an entity, a user action, a form factor, an organizational role, and the record type.

10. The computer program product of claim 7, wherein the display criteria are associated with a custom object created by a system administrator.

11. The computer program product of claim 7, wherein the hierarchy of rules comprises a preconfigured rule comprising preconfigured display criteria associated with the preconfigured user interface page.

12. The computer program product of claim 7, wherein the program code comprises further instructions to:
identify a hierarchical rule that is a hierarchical match for the request criteria associated with the user action in response a determination that the action override rule in the hierarchy of rules does not match the request criteria associated with the user action; and
display a user interface page associated with the hierarchical rule that is the hierarchical match for the request criteria associated with the user action.

13. A method comprising:
storing one or more action override rules into a hierarchy of rules applicable to a plurality of users, the hierarchy of rules having a default first level rule and one or more default second level rules, the default first level rule and the one or more default second level rules each including display criteria associated with a corresponding one of a plurality of user interface pages, each of the one or more action override rules including display criteria associated with a corresponding user interface page of the plurality of user interface pages;
receiving a user action associated with a request criteria;
determining whether the request criteria associated with the user action matches the display criteria of the one or more action override rules;
causing, in response a determination that the display criteria of one of the action override rules matches the request criteria associated with the user action, the display of the user interface page associated with the display criteria of the action override rule with the matching criteria; and
causing, in response to a determination that there is no action override rule having display criteria that matches the request criteria associated with the user action, the display of the user interface page associated with the display criteria of a corresponding one of the one or more default second level rules.

14. The method of claim 13, wherein the display criteria are created by a system administrator selecting from a plurality of display criterion options.

15. The method of claim 13, wherein the display criteria are associated with at a plurality of a software application, an entity, a user action, a form factor, an organizational role, and the record type.

16. The method of claim 13, wherein the display criteria are associated with a custom object created by a system administrator.

17. The method of claim 13, wherein the hierarchy of rules comprises a preconfigured rule comprising preconfigured display criteria associated with the preconfigured user interface page.

18. The method of claim 13, the method further comprising:
identifying a hierarchical rule that is a hierarchical match for the request criteria associated with the user action in response a determination that the action override rule in the hierarchy of rules does not match the request criteria associated with the user action; and
displaying a user interface page associated with the hierarchical rule that is the hierarchical match for the request criteria associated with the user action, wherein the hierarchical match is based on at least one of a greatest number of matching criteria, a selected option that is hierarchically above another option in a hierarchy of selectable options, and a default criterion.

* * * * *